United States Patent [19]

Hornfeck et al.

[11] Patent Number: 5,232,551
[45] Date of Patent: Aug. 3, 1993

[54] PROCESS FOR THE FLOTATION OF FILLERS FROM DEINKED WASTE PAPER USING ORGANIC PHOSPHORIC ACID ESTERS

[75] Inventors: Klaus Hornfeck, Mettmann; Rainer Hoefer; Wolfgang von Rybinski, both of Duesseldorf, all of Fed. Rep. of Germany

[73] Assignee: Henkel Kommanditgesellschaft auf Aktien, Duesseldorf, Fed. Rep. of Germany

[21] Appl. No.: 721,516

[22] PCT Filed: Jan. 5, 1990

[86] PCT No.: PCT/EP90/00024
§ 371 Date: Jul. 12, 1991
§ 102(e) Date: Jul. 12, 1991

[87] PCT Pub. No.: WO90/08220
PCT Pub. Date: Jul. 26, 1990

[30] Foreign Application Priority Data

Jan. 14, 1989 [DE] Fed. Rep. of Germany ....... 3900941

[51] Int. Cl.$^5$ ............................................. D21C 5/02
[52] U.S. Cl. ............................................. 162/5; 162/8
[58] Field of Search ..................................... 162/5, 8

[56] References Cited

U.S. PATENT DOCUMENTS

| | | | |
|---|---|---|---|
| 3,986,922 | 10/1976 | Parker et al. | 162/5 |
| 4,360,402 | 11/1982 | Ortner et al. | 162/5 |
| 4,368,101 | 1/1983 | Bahr et al. | 162/4 |

FOREIGN PATENT DOCUMENTS

| | | | |
|---|---|---|---|
| 0030057 | 6/1981 | European Pat. Off. | 162/5 |
| 0066894 | 12/1982 | European Pat. Off. | 162/5 |
| 5029041 | 9/1975 | Japan | 162/5 |
| 62-21891 | 1/1987 | Japan | 162/5 |

*Primary Examiner*—Karen M. Hastings
*Attorney, Agent, or Firm*—Ernest G. Szoke; Wayne C. Jaeschke; Norvell E. Wisdom, Jr.

[57] ABSTRACT

The invention relates to a process for the flotation of fillers from deinked wastepaper in the presence of organic phosphoric acid esters. The flotation of the fillers occurs after deinking the wastepaper by flotation.

4 Claims, No Drawings

PROCESS FOR THE FLOTATION OF FILLERS FROM DEINKED WASTE PAPER USING ORGANIC PHOSPHORIC ACID ESTERS

BACKGROUND OF THE INVENTION

1. Field of the Invention

This invention relates to a process for the removal of fillers from wastepaper and to the use of certain organic phosphoric acid esters for the removal of fillers from wastepaper.

2. Statement of Related Art

Fillers are added to almost all papers to improve their printability, their density and their opacity and to obtain a more uniform degree of light transmission and greater whiteness. The fillers used are mineral by nature or are chemically precipitated products, for example aluminum silicates, such as kaolins or siliceous alumina, calcium carbonates, such as chalk or lime, talcum, calcium sulfate and/or barium sulfate (*Ullmanns Encyklopadie der technischen Chemie* 17, 577 et seq. (1979)). The filler content of the paper stock depends on the purpose for which the paper is to be used and, in most cases, is between 7 and 25% by weight. To be able to produce a paper having standardized quality features, it is essential that the starting materials and auxiliaries used to make the paper are of uniform quality. Printed wastepaper is used in large quantities in the production of printing paper and tissue paper. To obtain high whiteness, the printing inks have to be removed from printed wastepaper. This is done by deinking processes essentially comprising two steps, namely:

1. pulping the wastepaper, i.e. fiberizing in water in the presence of the chemicals required for detachment of the printing ink particles and
2. removal of the detached printing ink particles from the fiber suspension.

The second step can be carried out by washing or flotation (*Ullmanns Encyklopadie der technischen Chemie*, 4th Edition, Vol. 17, pages 570-571 (1979)). In flotation, which utilizes the difference in wettability between printing inks and paper fibers, air is forced or drawn through the fiber suspension. Small air bubbles attach themselves to the printing ink particles and form a froth at the surface of the water which is removed by clarifiers.

The deinking of wastepaper is normally carried out at alkaline pH values in the presence of alkali hydroxides, alkali silicates, oxidative bleaches and surfactants at temperatures in the range from 30° to 50° C. Soaps and/or fatty alcohol polyglycol ethers are often used as surfactants which are responsible for the detachment and separation of the printing inks (*Ullmanns Encyklopa die der technischen Chemie*, 4th Edition, Vol. 17, pages 571-572 (1979)). JP 61/207686, reported in Chem. Abstr. 106, 121694v, describes the use of aliphatic α-sulfocarboxylic acids and aliphatic α-sulfocarboxylic acid esters in flotation deinking processes. According to Russian patents SU 773 174, reported in Derwent 51102 D/28 and SU 717 95 reported in Derwent 72992 C/41, good results are obtained in the flotation of printing ink when wastepaper is treated with mixtures containing alkyl sulfonates and soaps. According to U.S. Pat. No. 1,925,372, particularly good deinking results can be obtained when filler-containing wastepaper is treated with aqueous solutions containing soaps and/or sulfonated mineral oils and the paper fibers are subsequently removed by filtration. In the case of filler-free printed wastepaper, fillers are separately added.

Unfortunately, the known processes for separating the detached printing ink particles from the fiber suspensions have serious disadvantages. The high filler component of wastepaper is only removed very incompletely by flotation, so that the proportion of deinked wastepaper is limited to around 50% by weight in paper manufacture, particularly in the manufacture of newsprint paper. Although the fillers present in wastepaper are removed by washing of the paper fibers, there is the disadvantage of a very high fiber loss and very serious water pollution.

It is known from Wochenblatt für Papierfabrikation 17, 646-649 (1985) that the removal of fillers by flotation can be increased if the wastepaper is treated with aqueous liquors containing alkyl benzenesulfonates in particular as surfactants and not with aqueous liquors containing soaps or nonionic surfactants. In many cases, however, the improvement in filler removal is not sufficient to meet the stringent requirements which the quality of reusable waste paper has to satisfy.

DESCRIPTION OF THE INVENTION

The invention is based on the surprising observation that the removal of fillers from aqueous paper stock suspensions is distinctly increased in the presence of certain organic phosphoric acid esters.

SUMMARY OF THE INVENTION

Accordingly, the present invention relates to a process for the removal of fillers from wastepaper which is characterized in that, after flotation of the printing ink, one or more phosphoric acid esters corresponding to general formula I

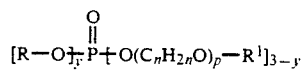

in which the R's represent hydrogen, an alkali metal cation, an ammonium cation or $(C_nH_{2n}O)_p-R^1$ and $R^1$ represents $C_{8-24}$ alkyl, $C_{5-12}$ cycloalkyl, $C_{8-24}$ alkenyl or mono-, di- or trialkylphenyl containing 1 to 12 C atoms in each alkyl radical, n is 2 or 3, p is a number of 0 to 100 and y is 0 or 1 or 2, is/are added to the aqueous paper stock suspensions in a total quantity of from 0.1 to 8 g/kg air-dry paper stock, followed by flotation in known manner.

The present invention also relates to the use of one or more organic phosphoric acid esters corresponding to general formula I for the removal of fillers from wastepaper by flotation.

Air-dry paper stock is paper stock in which an equilibrium state of internal moisture has been established. This is dependent on temperature and relative air humidity.

"Fillers" are understood to be the substances typically used in the paper industry, for example aluminium silicates, such as kaolins or siliceous alumina, and/or calcium carbonates, such as chalk or lime.

DESCRIPTION OF PREFERRED EMBODIMENTS

Suitable organic phosphoric acid esters corresponding to general formula I

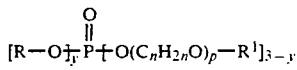

are in particular those in which the R's represent hydrogen, an alkali metal cation, an ammonium cation or $(C_nH_{2n}O)_p$—$R^1$ and $R^1$ represents $C_{8-24}$ alkyl, tributylphenyl, iso-octylphenyl, iso-nonylphenyl or iso-dodecylphenyl and n is 2, p is a number of 4 to 60 and y is 1 or 2. The phosphoric acid alkyl, cycloalkyl, alkenyl and/or alkylphenyl esters are prepared in known manner by reaction of preferably alkoxylated alkyl, cycloalkyl and/or alkenyl alcohols and/or alkylphenols with phosphorus pentoxide or polyphosphoric acid (Winnacker/Küchler in *Chemische Technologie*, 4th Edition, Vol. 7, pages 123 to 124, Carl Hanser Verlag (1986)). Mixtures of mono- and diesters are mainly formed in this process. Phosphorus oxychloride is used for the production of high-purity triesters. The optionally alkoxylated aliphatic alcohols and/or phenols used as educts are obtained by alkoxylation with ethylene oxide and/or propylene oxide by known industrial processes (Winnacker/Küchler in *Chemische Technologie*, Vol. 7, pages 131 to 132, Carl Hanser Verlag München (1986)).

According to the invention, organic phosphoric acid esters corresponding to general formula I are added to the aqueous paper stock suspensions at 20° to 60° C. after flotation of the printing ink, preferably in a quantity of 1 to 4 g per kg air-dry paper stock. The pH value of the suspensions is between 7 and 11 and preferably between 8 and 10. The paper stock content in the suspensions is, for example, from 0.5 to 2% by weight. Flotation is then carried out in known manner at temperatures of 20° to 95° C. and preferably at temperatures of 45° to 60° C., for example in a Denver flotation cell.

The fibrous material obtained by the process according to the invention is distinguished from fibrous material floated in the presence of typical surfactants by distinctly lower filler contents. It is now possible by the process according to the invention to increase the proportion of deinked wastepaper in paper manufacture to more than 50% by weight.

EXAMPLES

EO stands for ethylene oxide.

Flotation was carried out in an approximately 9 liter Denver laboratory flotation cell using aqueous filler suspensions and aqueous paper stock suspensions.

EXAMPLE 1

FILLER SUSPENSIONS 23 g fillers were dispersed in 9 l water and the resulting dispersion adjusted with sodium hydroxide to a pH value of 8.5 to 9.0. After the addition of 0.2 g active substance in the form of phosphoric acid ester, flotation was carried out for 7 minutes in the Denver laboratory flotation cell. The solids component in the overflow from the flotation cell was filtered off, dried at 105° C. to constant weight and weighed. The results are shown in Table 1.

TABLE 1

| Surfactants used | Fillers used | Filler from the overflow in % by weight |
|---|---|---|
| Sodium salt of a | Kaolin | 60 |

TABLE 1-continued

| Surfactants used | Fillers used | Filler from the overflow in % by weight |
|---|---|---|
| mono-/diphosphate mixture of iso-nonyl phenol + 6.5 mol EO*) | CaCO₃ Kaolin/CaCO₃**) | 98 75 |
| Sodium salt of a mono-/diphosphate mixture of iso-nonyl phenol + 10 mol EO*) | Kaolin CaCO₃ Kaolin/CaCO₃**) | 78 96 75 |
| For comparison: | | |
| Sodium salt of iso-nonylphenol + 10 mol EO sulfate | Kaolin CaCO₃ Kaolin/CaCO₃**) | 12 45 12 |

*)Molar ratio of monoester to diester approx. 2:1
**)Mixture of 70% by weight kaolin and 30% by weight CaCO₃

EXAMPLE 2

PAPER STOCK SUSPENSIONS

Air-dry paper stock from newspapers and magazines (ratio by weight 1:1) was subjected to printing ink flotation with the chemicals normally used. After flotation of the printing ink, the paper stock suspension had a stock density of 1% by weight, a temperature of 40° C., a pH value of 9.0 and an ash content of 16% by weight. 0.2 g active substance in the form of phosphoric acid ester was added to 9 l of the deinked paper stock suspension having a stock density of 1% by weight, followed by flotation for 10 minutes in the Denver laboratory flotation cell. After flotation, the paper stock was freed from water in paper filters, dried at 105° C. to constant weight and its ash content determined in accordance with DIN 54 371. The results are shown in Table 2.

TABLE 2

| Phosphoric acid ester used | Filler content after flotation in the paper in % by weight |
|---|---|
| Sodium salt of a mono-diphosphate mixture of iso-nonylphenyl + 6.5 mol EO (molar ratio of monoester to diester about 2:1) | 6.5 |

We claim:

1. A process for the removal by flotation of fillers from deinked suspensions of fibers derived from waste paper, wherein after deinking said wastepaper by flotation, the improvement comprises adding to the suspensions of fibers from 0.1 to 8 g. per kilogram of air-dry paper stock, of one or more phosphoric acid esters corresponding to general formula I:

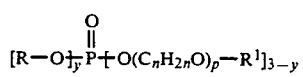

in which R in each {R—O} moiety is independently selected from the group consisting of hydrogen, an alkali metal cation, an ammonium cation and $(C_nH_{2n}O)_p$—$R^1$ and $R^1$ represents $C_{8-24}$ alkyl, $C_{5-12}$ cycloalkyl, $C_{8-24}$ alkenyl or mono-, di- or trialkylphenyl containing 1 to 12 C atoms in each alkyl radical; n is 2 or 3; p is a number of 0 to 100; and y is 0 or 1 to 2, and then removing said fillers by flotation.

2. A process as claimed in claim 1, wherein the total amount of organic phosphoric acid esters corresponding to general formula I added to the paper stock suspensions is from 1 to 4 g/kg of air-dry paper stock.

3. A process as claimed in claim 2, wherein the organic phosphoric acid esters are selected from the group corresponding to general formula I when R in each {R—O} moiety is independently selected from the ammonium cation or $(C_nH_{2n}O)_p$—$R^1$; $R^1$ represents $C_{8-24}$ alkyl, tributylphenyl, iso-octylphenyl, iso-nonylphenyl, or iso-dodecylphenyl; n is 2; p is a number of 4 to 60; and y is 1 or 2.

4. A process as claimed in claim 1, wherein the organic phosphoric acid esters are selected from the group corresponding to general formula I when R in each {R—O} moiety is independently selected from the group consisting of hydrogen, an alkali metal cation, an ammonium cation or $(C_nH_{2n}O)_p$—$R^1$; $R^1$ represents $C_{8-24}$ alkyl, tributylphenyl, iso-octylphenyl, iso-nonylphenyl, or iso-dodecylphenyl; n is 2; p is a number of 4 to 60; and y is 1 to 2.

* * * * *